(12) United States Patent
Lounder et al.

(10) Patent No.: US 10,225,991 B2
(45) Date of Patent: Mar. 12, 2019

(54) NEEDLE GRIPPER FOR AN AGRICULTURAL BALER

(71) Applicant: CNH Industrial America LLC, New Holland, PA (US)

(72) Inventors: Joshua L. Lounder, Honeybrook, PA (US); Dominick B. Rizzon, Leola, PA (US); Shaun A. O'Donnell, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 920 days.

(21) Appl. No.: 14/674,042

(22) Filed: Mar. 31, 2015

(65) Prior Publication Data

US 2015/0272008 A1     Oct. 1, 2015

Related U.S. Application Data

(60) Provisional application No. 61/973,071, filed on Mar. 31, 2014.

(51) Int. Cl.
    *A01F 15/12*      (2006.01)
    *A01F 15/04*      (2006.01)
    (Continued)

(52) U.S. Cl.
    CPC .............. *A01F 15/12* (2013.01); *A01F 15/04* (2013.01); *A01F 15/042* (2013.01);
    (Continued)

(58) Field of Classification Search
    CPC ......... B65B 13/24; B65B 13/26; B65B 13/28; A01F 15/145; A01F 15/0858; A01F 15/12; A01F 15/14; A01F 15/071; A01F 15/146
    (Continued)

(56) References Cited

U.S. PATENT DOCUMENTS

| | | | | |
|---|---|---|---|---|
| 335,677 | A | * | 2/1886 | Blakely et al. ......... A01F 15/12 56/450 |
| 492,444 | A | * | 2/1893 | Strode ..................... A01F 15/12 56/450 |

(Continued)

FOREIGN PATENT DOCUMENTS

| | | |
|---|---|---|
| DE | 1085460 B | 7/1960 |
| DE | 102012008554 A1 | 11/2013 |

(Continued)

*Primary Examiner* — Jimmy T Nguyen
*Assistant Examiner* — Gregory Swiatocha
(74) *Attorney, Agent, or Firm* — Patrick M. Sheldrake; Peter K. Zacharias

(57) ABSTRACT

An agricultural baler includes a needle disposed within a baling chamber. The needle transfers a strap to a gripping device. A needle gripper is disposed on a distal end of the needle and configured to selectively secure the strap to the needle. The needle gripper includes a thumb gripper rotatably mounted to a wall of the needle gripper. The thumb gripper rotates between a first position configured to secure the strap against a surface of the needle and a second position configured to release the strap from the needle. The needle gripper includes a release arm coupled to the thumb gripper and configured to rotate the thumb gripper from the first position to the second position in response to rotation of the release arm about a release arm axis from a neutral position to a first release position.

19 Claims, 8 Drawing Sheets

(51) Int. Cl.
*A01F 15/08* (2006.01)
*A01F 15/14* (2006.01)
*B30B 9/30* (2006.01)

(52) U.S. Cl.
CPC .......... *A01F 15/0858* (2013.01); *A01F 15/14* (2013.01); *B30B 9/301* (2013.01)

(58) Field of Classification Search
USPC .............................................. 100/24; 56/450
See application file for complete search history.

(56) References Cited

U.S. PATENT DOCUMENTS

| | | | |
|---|---|---|---|
| 1,452,712 A * | 4/1923 | Seymour | A01F 15/12 100/24 |
| 3,211,084 A * | 10/1965 | Barfield | A01F 15/12 100/24 |
| 3,866,532 A | 2/1975 | Ogden | |
| 5,117,615 A | 6/1992 | Kung et al. | |
| 6,035,774 A | 3/2000 | Fischer | |
| 6,328,087 B1 | 12/2001 | Finzo et al. | |
| 6,681,689 B2 | 1/2004 | Geiser | |
| 7,513,088 B2 | 4/2009 | Vande Ryse | |

FOREIGN PATENT DOCUMENTS

| | | |
|---|---|---|
| EP | 0076741 A1 | 4/1983 |
| FR | 2254483 A1 | 7/1975 |
| FR | 2676611 A1 | 5/1992 |
| WO | 2014144566 A1 | 9/2014 |

* cited by examiner

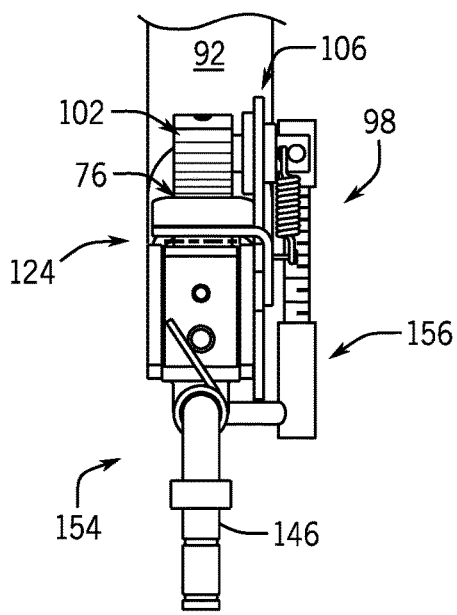
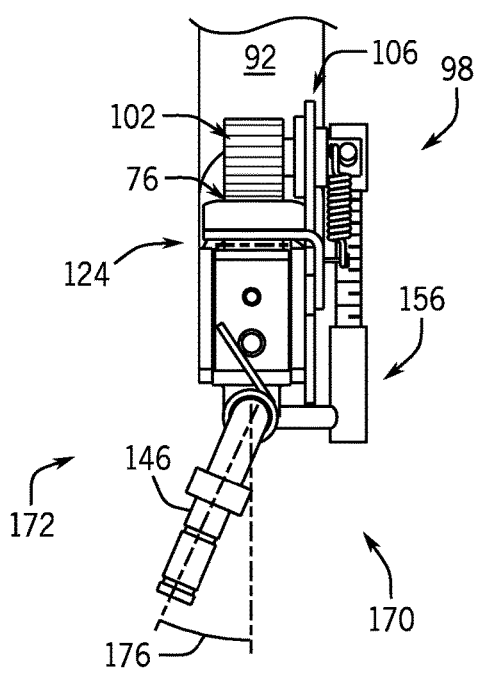
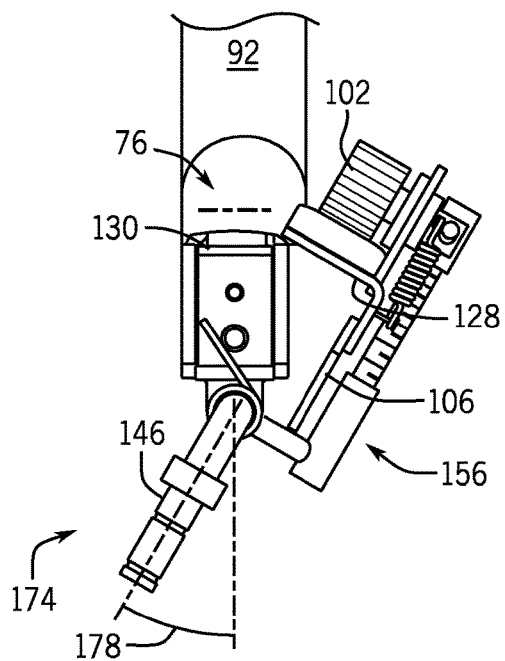

NEEDLE GRIPPER FOR AN AGRICULTURAL BALER

CROSS REFERENCE TO RELATED APPLICATIONS

This application claims the benefit of and priority to U.S. Provisional Application No. 61/973,071, filed Mar. 31, 2014, entitled NEEDLE GRIPPER FOR AN AGRICULTURAL BALER, which is hereby incorporated by reference in its entirety.

BACKGROUND

The present invention relates generally to the field of packaging compressible materials, and more particularly, to systems for strapping bales of crop materials.

Generally, rectangular or square balers are utilized to compress certain materials into rectangular bales to facilitate storage and handling of the material. Usually, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale during subsequent processing operations. In addition, the tensile strength of twine may be too low to effectively bind compressed materials in certain applications.

SUMMARY OF THE INVENTION

In one embodiment an agricultural baler includes a needle configured to be disposed within a baling chamber. In some embodiments, the needle is configured to transfer a strap to a gripping device. The agricultural baler also includes a needle gripper disposed on a distal end of the needle and configured to selectively secure the strap to the needle. The needle gripper includes a thumb gripper rotatably mounted to a wall of the needle gripper. In some embodiments, the thumb gripper is configured to rotate between a first position configured to secure the strap against a surface of the needle and a second position configured to release the strap from the needle. The needle gripper also includes a release arm coupled to the thumb gripper. The release arm is configured to rotate the thumb gripper from the first position to the second position in response to rotation of the release arm about a release arm axis from a neutral position to a first release position.

In another embodiment an agricultural baler includes a needle configured to be disposed within a baling chamber. The needle is configured to transfer a strap to a gripping device. The agricultural baler also includes a needle gripper disposed on a distal end of the needle and configured to selectively secure the strap to the needle. In some embodiments, the needle gripper includes a thumb gripper rotatably mounted to a wall of the needle gripper. The thumb gripper is configured to secure the strap against a surface of the needle. The needle gripper also includes a strap guide positioned on a distal end of the needle gripper. In certain embodiments, the strap guide comprises a top plate mounted to the wall and configured to secure the strap against a bottom plate mounted to the needle. The needle gripper further includes a release arm coupled to the wall. In some embodiments, the release arm is configured to rotate the wall between a first position configured to align the thumb gripper with the surface of the needle and to align the top surface of the strap guide with the bottom surface of the strap guide, and a second position configured to offset the thumb gripper and strap guide from the strap via rotation of the release arm about a release arm axis.

A method for baling an agricultural material includes looping an end of a strap around at least a portion of the agricultural material. The method also includes transferring the end of the strap to a gripping device via a needle gripper on a distal end of a needle. The method further includes releasing the strap from the needle gripper as a release arm of the needle gripper rotates about a release arm axis from a neutral position through a first release position and to a second release position. In some embodiments, the release arm is coupled to a release linkage configured to rotate a thumb gripper from a first position in which the thumb gripper is configured to secure the strap to a surface of the needle to a second position configured to release the strap from the needle in response to rotation of the release arm from the neutral position to the first release position, and the release arm is coupled to a wall configured to rotate from a third position in which the thumb gripper is aligned with the needle and a fourth position configured to offset the thumb gripper from the surface of the needle in response to rotation of the release arm from the neutral position to the second release position.

DRAWINGS

These and other features, aspects, and advantages of the present invention will become better understood when the following detailed description is read with reference to the accompanying drawings in which like characters represent like parts throughout the drawings, wherein:

FIG. 6 is a top view of the needle gripper of FIG. 4, in which a release arm is in the neutral position;

FIG. 7 is a top view of the needle gripper of FIG. 4, in which the release arm is in a first release position;

FIG. 8 is a top view of the needle gripper of FIG. 4, in which the release arm is in a second release position;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a system and method for strapping a bale of agricultural material. In particular, a system for transferring a strap between various components in a baler is disclosed. For example, in certain embodiments, a needle gripper may be used to transfer a strap end across a baling chamber to a sealing assembly. The needle gripper may mechanically secure the strap against the needle as the needle moves through a baling chamber. In certain embodiments, the needle gripper includes a mounting wall to which a thumb gripper is coupled and configured to hold the strap against the needle. Moreover, the needle gripper may include a strap guide to position the strap end at a distal end of the needle. In some embodiments, the needle gripper includes a release assembly configured to release the strap from the thumb gripper and the strap guide as the needle reaches a desired position within the baling chamber (e.g., proximate to the sealing assembly). For example, while a release arm of the release assembly is in a neutral position, the needle gripper holds the strap against the needle via the thumb gripper and/or the strap guide. However, as the release arm is driven to rotate toward a release position, the thumb gripper may be urged away from the strap and/or the wall may be rotated away from the strap to facilitate transfer of the strap to the sealing assembly or to another gripping device. In certain embodiments, an engagement plate facilitates movement of the release arm from the neutral position to the release position.

Figure 1:
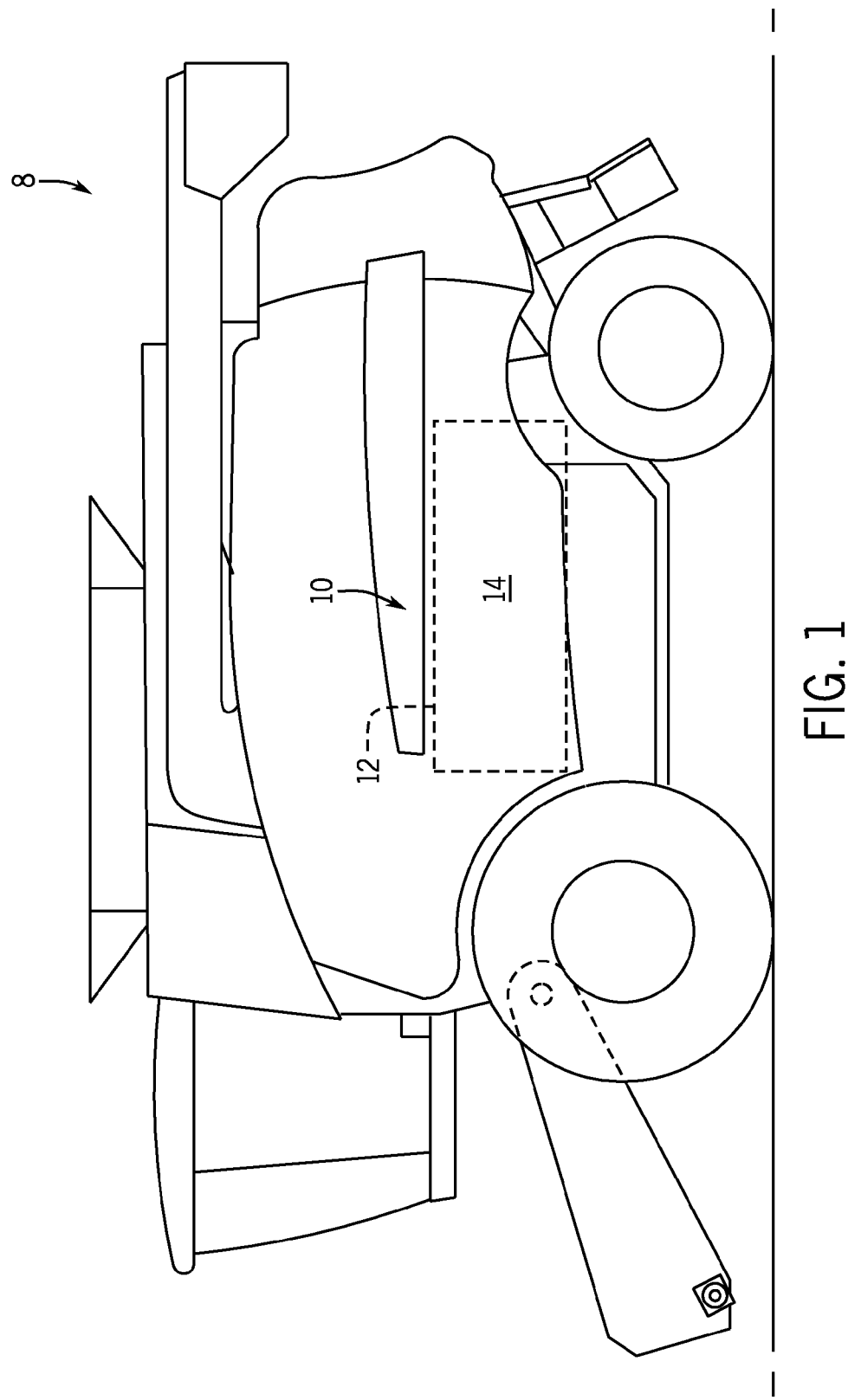
FIG. 1 is a side view of an embodiment of a self-contained vehicle including a baler.

Turning now to the drawings, FIG. 1 is a side view of a self-contained vehicle 8 having a baler 10. As illustrated, a frame 12 defines a baling chamber 14 that is supported and/or mounted within or on the self-contained vehicle 8. Material may flow into the baling chamber 14 via a conveyance system, where the material is baled in a manner described below. Thus, the baler 10 may be configured to collect and bale material as the self-contained vehicle 8 travels through the field.

Figure 2:
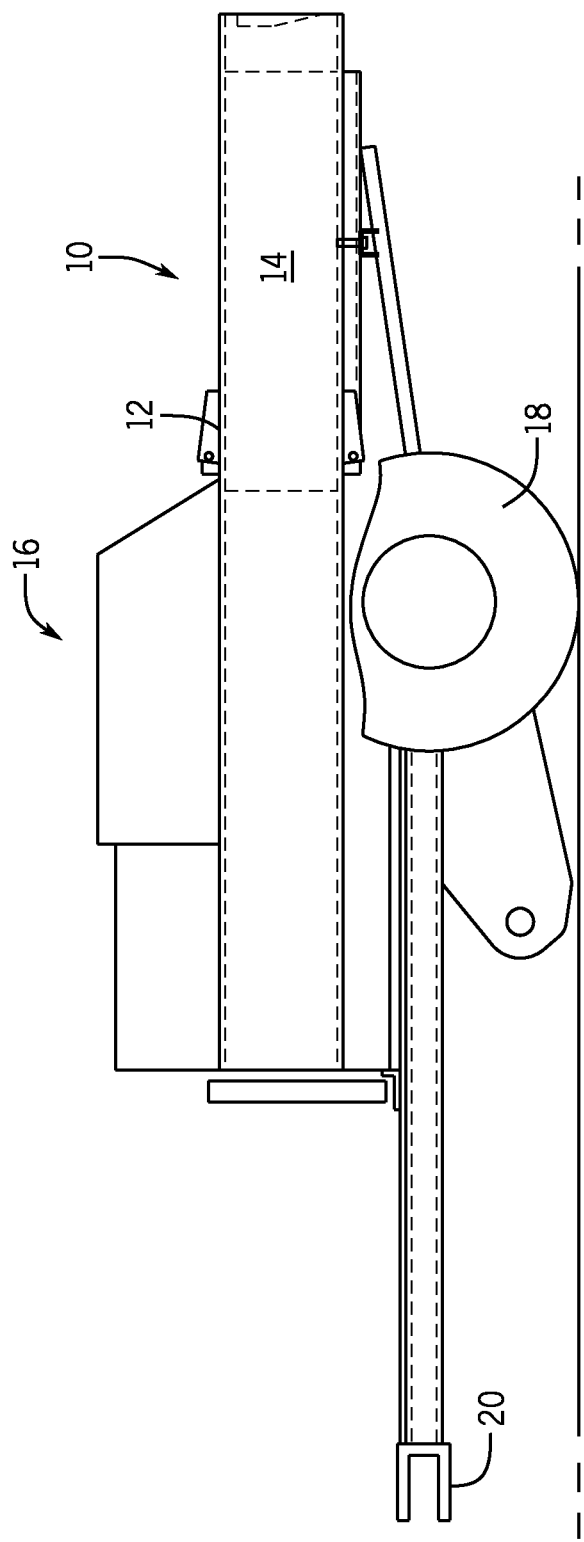
FIG. 2 is a side view of an embodiment of a towable implement having a baler, in which the towable implement is configured to be towed by a tow vehicle.

FIG. 2 is a side view of an embodiment of a towable implement 16 having the baler 10, in which the towable implement 16 is configured to be towed by a tow vehicle. As shown, the towable implement 16 includes the baler 10 having the baling chamber 14. The towable implement 16 may be ground-supported by wheels 18 and may be coupled to a tow vehicle (e.g., a harvester, a tractor, etc.) by a projection 20 that is configured to connect the towable implement 16 to the tow vehicle. Thus, the towable implement 16 may be pulled through a field. In such a configuration, the baler 10 collects and bales material as the towable implement 16 travels through the field behind the tow vehicle. It should be understood that the baler 10 disclosed herein may be incorporated in and/or utilized with any suitable implement or vehicle.

Figure 3:
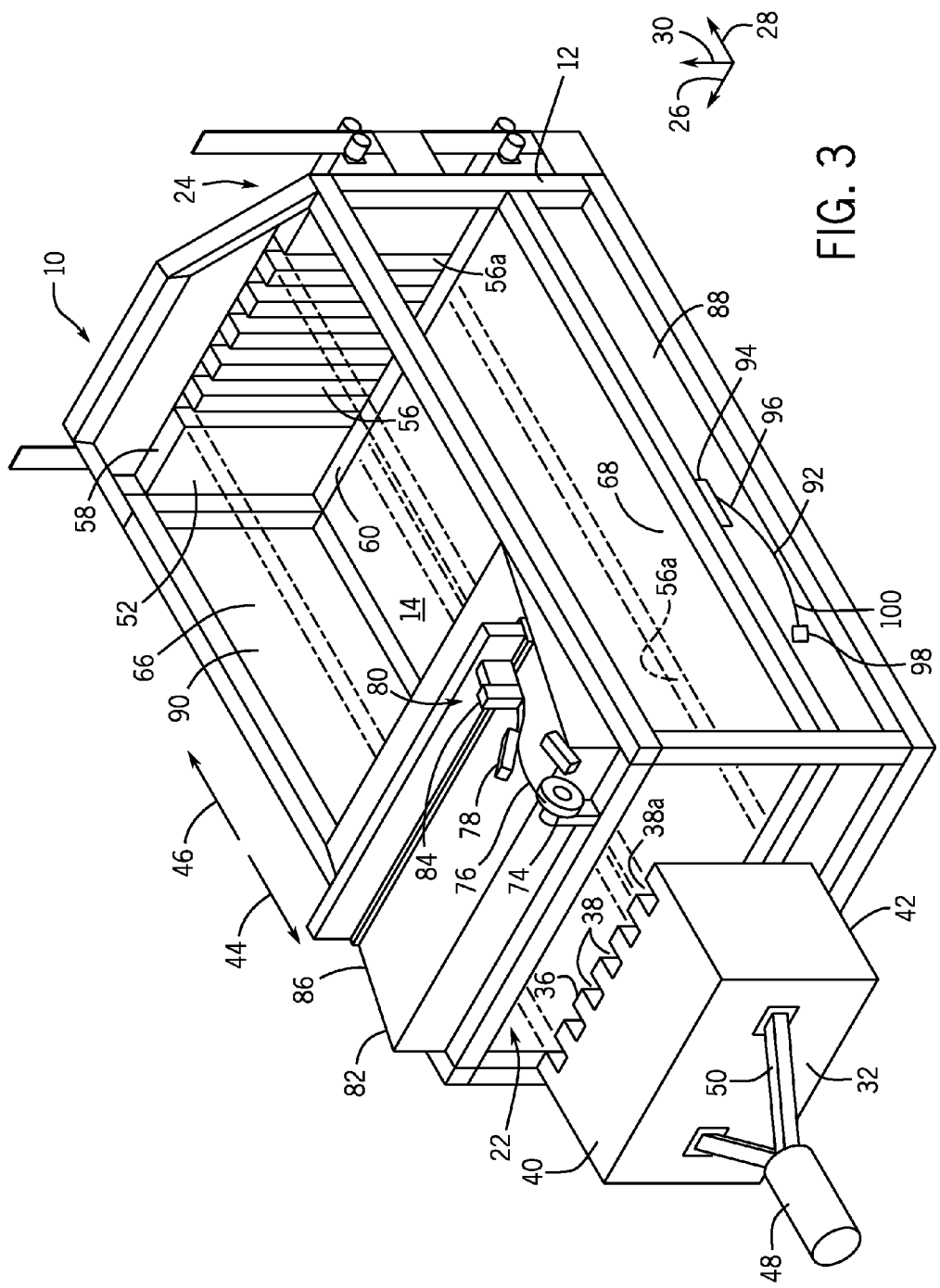
FIG. 3 is a perspective view of an embodiment of a portion of a baler configured to form and to strap rectangular bales of material.

FIG. 3 is a perspective view of an embodiment of a portion of the baler 10 configured to form and to strap rectangular bales of material (e.g., crop material, such as hay, straw, grasses, silage, corn stalks, tobacco, cotton, biomass, etc.). In the illustrated embodiment, the baler 10 includes the frame 12 defining the baling chamber 14. The baling chamber 14 includes a first end 22 (e.g., forward end) and a second end 24 (e.g., rear end), which may generally relate to the direction of travel of the baler 10. For example, the baler 10 may be coupled to the tow vehicle and pulled through a field, collecting and baling the crop material as the baler 10 travels through the field. When connected to the tow vehicle, the forward end 22 is proximal to the vehicle, while the rear end 24 is distal from the tow vehicle. The baler 10 may also be included in a self-propelled chassis, or may be part of the self-contained vehicle 8, as discussed above. The baler 10 and/or the baling chamber 14 may be further defined as having a lateral axis 26, a longitudinal axis 28, and a vertical axis 30. Although the illustrated embodiment includes a horizontal rectangular baler 10, it should be understood that the systems disclosed herein may be readily adapted for use in other types of balers 10, such as vertical balers. Additionally, although the illustrated embodiment includes a baler 10 configured to bind the bale around the lateral axis 26, in other embodiments the baler 10 may be configured to bind the bale around the longitudinal axis 28 and/or the vertical axis 30, as discussed in more detail below.

In the baler 10 of FIG. 3, the material enters the baling chamber 14 through the forward end 22, and the material is compressed within the baling chamber 14 by a forward plunger 32. The forward plunger 32 then moves axially (e.g., along the longitudinal axis 28) within the baling chamber 14 to drive the compressible material rearwardly toward the rear end 24. In the illustrated embodiment, the forward plunger 32 includes a material-facing surface 36. As shown, the forward plunger 32 includes multiple parallel slots 38 open to the baling chamber 14. The slots 38 extend from a first end 40 (e.g., top end) of the forward plunger 32 to a second end 42 (e.g., bottom end) of the forward plunger 32. The slots 38 are generally aligned with the vertical axis 30 of the baler 10 and are spaced apart from one another along the lateral axis 26 substantially evenly across the material-facing surface 36 of the forward plunger 32. As shown, six slots 38 are provided on the material-facing surface 36 of the forward plunger 32, although two, three, four, five, seven, eight, nine, ten, or more slots may be provided in other embodiments. It should be understood that the forward plunger 32 and the material-facing surface 36 of the forward plunger 32 may have any form suitable for compressing the material within the baling chamber 14. For example, the forward plunger 32 may include a series of separate, spaced apart bars, or in other embodiments, the forward plunger 32 may have a uniform, flat material-facing surface 36.

The forward plunger 32 is configured to move axially within the baling chamber 14 in a reciprocating motion along the longitudinal axis 28 of the baler 10. In other words, the forward plunger 32 is configured to move in a first direction 44 (e.g., forward direction or forwardly) and in a second direction 46 (e.g., rearward direction or rearwardly). In the illustrated embodiment, the forward plunger 32 is coupled to an actuator 48 via one or more arms 50. The actuator 48 may be a hydraulic cylinder or a pneumatic cylinder, or the actuator 48 may include a piston that drives a flywheel to power a gearbox. The gearbox may, in turn, rotate crank arms that are coupled to the arms 50, thereby facilitating motion of the forward plunger 32. Regardless of its form, the actuator 48 is configured to control the reciprocating motion of the forward plunger 32.

In the illustrated embodiment, the baler 10 includes a rear door 52 (e.g., a wall or a support structure) disposed at or near the rear end 24 of the baler 10 and opposite the forward plunger 32. As shown, the rear door 52 has multiple parallel tracks 56 configured to open toward the baling chamber 14. The tracks 56 extend from a first end 58 (e.g., top end) of the rear door 52 to a second end 60 (e.g., bottom end) of the rear door 52, and the tracks 56 are generally aligned with the vertical axis 30 of the baler 10. The tracks 56 are spaced apart from one another evenly across the rear door 52 along the lateral axis 26. Furthermore, each track 56 of the rear door 52 is disposed opposite (e.g., aligned with) one corresponding slot 38 of the forward plunger 32. In certain embodiments, the rear door 52 is moveable and is coupled to one or more actuators (e.g., hydraulic cylinders, pneumatic cylinders, etc.) configured to facilitate movement of the rear door 52. For example, the rear door 52 may be configured to move vertically (e.g., along the vertical axis 30) between a closed position that blocks the bale from exiting the baling chamber 14 and an open position that enables the bale to exit the baling chamber 14. In alternate embodiments, the rear door 52 may be configured to rotate relative to the baling chamber 14 to enable the bale to exit the baling chamber. In certain embodiments, the rear door 52 may be configured to move in a reciprocating manner along the longitudinal axis 28 of the baling chamber 14, and thus may be a rear plunger.

As shown in FIG. 3, the baling chamber 14 has a first wall 66 (e.g., a top wall) and a second wall 68 (e.g., a bottom wall), opposite the first wall 66. The first wall 66 and the second wall 68 extend generally between the forward plunger 32 and the rear door 52. In the illustrated embodiment, the first wall 66 and the second wall 68 have multiple parallel tracks 56 open toward the baling chamber 14. The tracks 56 disposed along the first wall 66 and the second wall 68 are positioned parallel to the longitudinal axis 28 of the baler 10. The tracks 56 disposed within the first wall 66 and the second wall 68 may extend along all or some of the length of the baling chamber 14 so as to accommodate the various axial positions of the forward plunger 32. The tracks 56 align with the slots 38 of the forward plunger 32 as the forward plunger 32 moves axially (e.g., along the longitudinal axis 28) within the baling chamber 14, as well as with the tracks 56 of the rear door 52, as discussed in more detail below.

Additionally, the slots 38 of the forward plunger 32 and the tracks 56 align with one another so as to surround, or substantially surround, the baling chamber 14. More specifically, the forward plunger 32 has a first slot 38a that aligns with a corresponding first track 56a of the first wall 66, the second wall 68, and the rear door 52 to substantially surround the baling chamber 14. As noted above, in some embodiments, two, three, four, five, six, or more slots 30 may be provided in the forward plunger 32, and a corresponding number of tracks 56 may be provided in the rear door 52, the first wall 66, and the second wall 68. As discussed in more detail below, the slots 38 and the tracks 56 are aligned to enable a strap to be directed or routed around the baling chamber 14 to strap the compressible material into a bale.

In the illustrated embodiment, the baler 10 includes a spool 74 configured to store and to provide a strap 76 for strapping the material within the baling chamber 14. In certain embodiments, the spool 74 may be accessible and/or removable to facilitate replacement and/or installation of the strap 76. As illustrated, the spool 74 provides the strap 76 to a strap feeding assembly 78, which is configured to direct and/or to propel the strap 76 around at least a portion of the baling chamber 14. For example, the strap feeding assembly 78 propels the strap 76 through at least a portion of the track 56 to surround at least a portion of the bale with the strap 76.

The baler 10 also includes a sealing assembly 80 having a sealing frame 82 and a sealing device 84. As discussed in more detail below, the sealing assembly 80 is configured to move relative to the baling chamber 14 to facilitate routing the strap 76 around the baling chamber 14 and/or to enable sealing of the strap 76 around the bale as the bale exits the baling chamber 14, for example. The sealing device 84 is configured to receive and/or to capture the strap 76, and to seal one portion of the strap 76 to another portion of the strap 76 to form the strap 76 into a sealed loop around the bale. Additionally, the sealing device 84 may be configured to cut the strap 76 and to grip the cut end of the strap 76 to facilitate strapping a subsequent bale. In some embodiments, the strap feeding assembly 78 may be aligned with the sealing device 84, enabling the strap 76 to be fed through the sealing device 84 and into an adjacent portion of the track 56 to facilitate surrounding the bale. In the illustrated embodiment, the strap feeding assembly 78 is integrated into the sealing assembly 80, and/or the sealing assembly 80 may be configured to propel the strap 76 around at least a portion of the baling chamber 14.

The sealing device 84 is coupled to the sealing frame 82 of the sealing assembly 80. The sealing frame 82 may have any suitable form for supporting the sealing device 82 and/or for facilitating movement of the sealing assembly 80 relative to the baling chamber 14. For example, as shown, the sealing frame 82 is positioned adjacent to the first wall 66 and extends laterally (e.g., along the lateral axis 26) between a first side wall 88 and a second side wall 90 of the baling chamber 14. The sealing frame 82 is coupled to a ramp 86 (e.g., an inclined structure) extending vertically upward (e.g., along the vertical axis 30) from the first wall 66 and extending from the first side wall 88 to the second side wall 90. As shown, the ramp extends laterally 26 across the baling chamber 14. However, in alternate embodiments, the ramp 86 may be two separate ramps (e.g., non-contacting ramps) positioned on opposite lateral sides of the baling chamber 14 and configured to support the sealing frame 82.

Although one spool 74, one strap feeding assembly 78, and one sealing device 84 are shown in FIG. 3 for clarity, it should be understood, in certain embodiments, that multiple sets of these components may be provided within the baler 10 to surround the bale with multiple straps 76. For example, as shown in FIG. 3, the spool 74, the strap feeding assembly 78, and the sealing device 84 are aligned with the first track 56a. However, a separate spool 74, strap feeding assembly 78, and sealing device 84 may be provided and aligned with each of the tracks 56. Thus, multiple straps 76 may be directed or routed through the tracks 56 and slots 30 to facilitate strapping the bale, as described in more detail below. Additionally, each of the sealing devices 84 may be coupled to the sealing frame 82. In some embodiments, each of the spools 74 and/or the strap feeding assemblies 78 may also be coupled to the sealing frame 82. Moreover, the components coupled to the sealing frame 82 of the sealing assembly 80 (e.g., the sealing device 84, the strap feeding assembly 78, and/or the spool 74) may move relative to the baling chamber 14 with the sealing frame 82.

As noted above, although the illustrated embodiments show systems for strapping the bale about the lateral axis 26 of the baler 10, it should be understood that the systems disclosed herein may be readily adapted for strapping the bale about the longitudinal axis 28 and/or the vertical axis 30. For example, to strap the bale about the vertical axis 30, the slots 38 may extend across the material-facing surface 36 of the forward plunger 32 such that the slots 38 are aligned with the lateral axis 26 of the baler 10 and are parallel to the top end 40 and to the bottom end 42 of the forward plunger 32. Similarly, the tracks 56 may extend across the rear door 52 such that the tracks 56 are aligned with the lateral axis 26 of the baler 10 and are parallel to the top end 58 and to the bottom end 60 of the rear door 52. In such configurations, each strap 76 may be propelled through the slot 38 extending laterally across the forward plunger 32 and through the track 56 extending laterally across the rear door 52. Additionally, in such configurations, rather than tracks 56 being formed in the top wall 66 and in the bottom wall 68, the tracks 56 may extend along the first side wall 88 and along the second side wall 90 of the baling chamber 14 between the forward plunger 32 and the rear door 52. Furthermore, in such cases, the spool 74, the strap feeding assembly 78, and/or the sealing assembly 80 may be disposed on the first side wall 88 of the baling chamber 14, for example. The components may function together to surround the bale with the strap 76 about the vertical axis 30 of the baler 10 and the components and system may be oriented and adapted for strapping the bale about the vertical axis 30.

The strap 76 may be formed from any suitable relatively high-strength material. For example, the strap 76 may have a strength of about 150 kilograms-force (kgf) to about 1500 kgf. In some embodiments, the strap 76 may have a strength of about 300 kgf to about 1200 kgf. The strap 76 may be any suitable width, although the strap 76 may be about 1 centimeter (cm) to about 5 cm wide, in some embodiments. In certain embodiments, the strap 76 may be formed from carbon steel or plastics, such as polypropylene or polyester. In some embodiments, the baler 10 is configured to form bales that are about 2 to about 3 meters long (along the longitudinal axis 28) by about 1 to about 2 meters wide (along the lateral axis 26) by about 0.5 to about 1 meters tall (along the vertical axis 30), and the strap 76 is of a suitable strength to securely strap bales of this size.

Additionally, the baler 10 depicted in FIG. 3 includes a needle 92, which may be generally disposed adjacent to the second wall 68 of the baling chamber 14. The needle 92 is configured to move through the baling chamber 14, and in some embodiments, the needle 92 may move through the baling chamber 14 along an arcuate path. In the illustrated embodiment, the needle 92 is configured to rotate about an attachment 94 coupled to a first end 96 of the needle 92. Additionally, in certain embodiments, the needle 92 may be coupled to a needle gripper 98 disposed generally near (e.g., proximate to) a second end 100 of the needle 92. The needle gripper 98 of the needle 92 is configured to receive and to grip the strap 76. The needle 92 and the needle gripper 98 may have any of a variety of configurations, and may be configured to transfer the strap 76 to a secondary gripper, as described in more detail below. For example, the needle 92 may be configured to transport the strap 76 from the second wall 68 to the first wall 66 of the baling chamber 14 to wrap the strap 76 around the bale and/or to transfer the strap 76 to the sealing device 84 of the sealing assembly 80.

Figure 4:
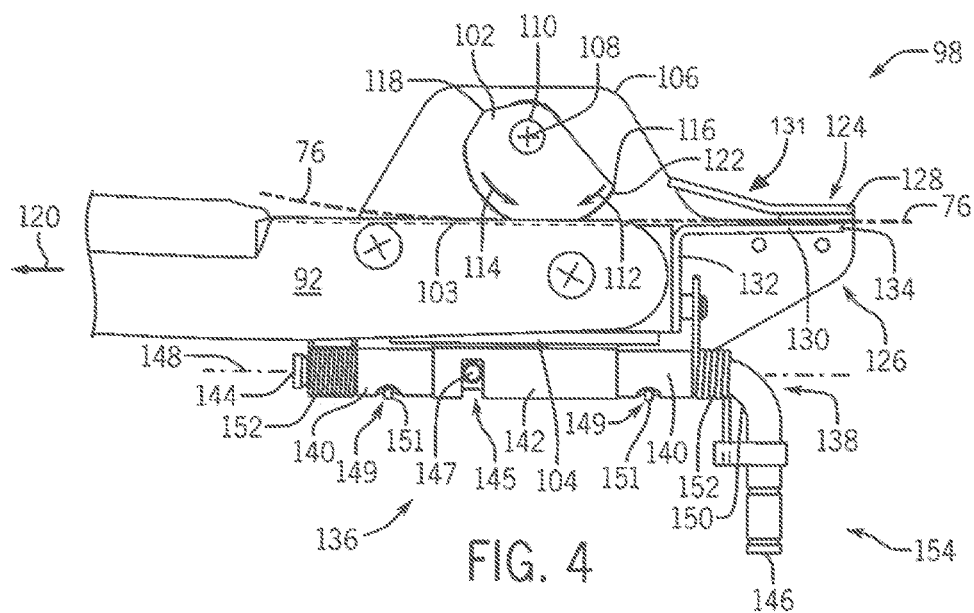
FIG. 4 is a right side view of an embodiment of a needle gripper that may be mounted on a needle within a baling chamber.

Turning to FIG. 4, a right side view of an embodiment of the needle gripper 98 is shown. As mentioned above, the needle gripper 98 holds the strap 76 against the needle 92 as the needle 92 transports the strap 76 throughout the baling chamber 14. In some embodiments, the needle gripper 98 is configured to transfer the strap 76 to the sealing assembly 80. To that end, the needle gripper 98 receives the strap 76 from the strap feeding assembly 76, secures the strap 76 between a thumb gripper 102 and a surface 103 of the needle 92, and releases the strap 76 when the end of the strap 76 is positioned proximate to the sealing assembly 80. However, in alternative embodiments, the needle gripper 98 may release the strap 76 when the end of the strap 76 is positioned proximate to a strap gripper disposed between the needle 92 and the sealing assembly 80.

As mentioned above, the needle gripper 98 is disposed on the second end 100 of the needle 92. In the illustrated embodiment, the needle gripper 98 includes a mounting platform 104 configured to couple the needle gripper 98 to the needle 92. For example, the mounting platform 104 may be coupled to the needle 92 using welding, fasteners, adhesives, or the like. Moreover, as described in detail below, the mounting platform 104 provides a connection for a mounting wall 106 to the needle 92 that enables the wall 106 to rotate between a neutral position and a release position.

In the illustrated embodiment, the thumb gripper 102 is rotatably mounted on the mounting wall 106, and the mounting wall 106 is rotatably coupled to the mounting platform 104 via a pivot shaft. In the illustrated embodiment, the thumb gripper 102 is coupled to a mounted bearing 108 that extends through the mounting wall 106 and establishes a thumb gripper axis 110. The mounted bearing 108 facilitates rotation in both a first direction 112 (e.g., clockwise) and a second direction 114 (e.g., counter clockwise) about the thumb gripper axis 110. For example, when the strap 76 engages with the thumb gripper 102, the thumb gripper 102 may rotate in the first direction 112 to secure the strap 76 between the thumb gripper 102 and the needle 92. Moreover, the thumb gripper 102 may rotate in the second direction 114 after the strap 76 is transferred to the sealing assembly 80 or to another gripping device to release the strap from the gripper 98.

As mentioned above, the thumb gripper 102 may rotate in the first direction 112 and in the second direction 114. However, once the strap 76 is secured between the thumb gripper 102 and the surface 103 of the needle 92, the rotation of the thumb gripper 102 in the first direction 112 is blocked. In the illustrated embodiment, the thumb gripper 102 includes a front end 116 that extends farther from the thumb gripper axis 110 than a back end 118. As a result, the thumb gripper 102 is configured to rotate in the first direction 112 until the front end 116 interferes with the rotation. In other words, the front end 116 is configured to contact the needle 92 or the strap 76, which is positioned against the needle 92, to block over rotation of the thumb gripper 102 in the first direction 112. As discussed above, the thumb gripper 102 is configured to hold the strap 76 against the surface 103 of the needle 92. In some embodiments, the thumb gripper 102 is biased to rotate in the first direction 112. Accordingly, the thumb gripper 102 applies a force to the strap 76 to compress and/or to hold the strap 76 against the surface 103 of the needle 92. As described in detail below, the thumb gripper 102 may include a biasing member to urge the thumb gripper 102 to rotate in the first direction 112. Accordingly, once the strap 76 is secured between the thumb gripper 102 and the surface 103 of the needle 92, the strap 76 is blocked from moving in a reverse direction 120 (i.e., in a direction toward the first end 96 of the needle 92. Therefore, in the illustrated embodiment, the strap 76 remains engaged with the needle gripper 98 as the needle 92 moves the strap 76 around the baling chamber 14.

In the illustrated embodiment, the thumb gripper 102 includes a textured surface 122 to facilitate gripping of the strap 76 by the thumb gripper 102. For example, the textured surface 122 may include knurling, grit, or the like to create a rough surface that enables the thumb gripper 102 to grip the strap 76 against the surface 103 of the needle 92. For example, in embodiments in which the textured surface 122 includes knurling, the teeth of the knurling may dig into the strap 76 to reduce slippage. Moreover, the textured surface 122 may further block the strap 76 from moving in the reverse direction 120.

In the illustrated embodiment, the griping assembly 98 includes a strap guide 124. As shown, the strap guide 124 is positioned on a distal end 126 of the needle gripper 98. As such, the strap guide 124 extends beyond the second end 100 of the needle 92. The strap guide 124 includes a top plate 128 and a bottom plate 130. As shown in FIG. 4, the top plate 128 is mounted on the mounting wall 106. As will be discussed in detail below, mounting the top plate 128 to the mounting wall 106 enables the top plate 128 to rotate off the strap 76 as the needle gripper 98 release the strap. In the illustrated embodiment, the top plate 128 includes a bend 131. The bend 131 biases the top plate 128 toward the bottom plate 130. In the illustrated embodiment, the bottom plate 130 is mounted to the needle 92. The bottom plate 130 includes a vertical portion 132 that is disposed adjacent to the needle 92. Additionally, the bottom plate 130 includes a horizontal portion 134 disposed adjacent to the top plate 128. In the illustrated embodiment, the strap 76 is held between the top plate 128 and the bottom plate 130 while the strap 76 is engaged with the needle gripper 98. That is, the top plate 128 applies a force against the strap 76 to urge the strap 76 toward the bottom plate 130, thereby securing the strap 76 between the top plate 128 and the bottom plate 130.

As mentioned above, the needle gripper 98 is configured to release the strap 76 when the strap 76 is positioned proximate to the sealing assembly 80 and/or the strap gripper. Accordingly, the needle gripper 98 includes a release assembly 136. In the illustrated embodiment, the release assembly 136 includes a release arm 138, a pivot shaft 140, and a pivot sleeve 142. As illustrated, the release arm 138 includes a first shaft portion 144 and a second shaft portion 146. As described in detail below, the second shaft portion 146 facilitates rotation of the release arm 138 about a release arm axis 148. As illustrated, the first shaft portion 144 of the release arm 138, the pivot shaft 140, and the pivot sleeve 142 are coaxial with respect to the release arm axis 148. The first shaft portion 144 and the second shaft portion 146 are connected by a bend 150. In the illustrated embodiment, the bend 150 is approximately 90 degrees. However, in some embodiments the bend 150 may be an acute or obtuse angle.

As shown in FIG. 4, the first shaft portion 144 of the release arm 138 is disposed within the pivot sleeve 142 and is configured to rotate about the release arm axis 148. The pivot sleeve 142 is coupled to and held in place by the mounting platform 104. However, the first shaft portion 144 of the release arm 138 is free to rotate within the pivot sleeve 142 about the release arm axis 148. In the illustrated embodiment, the pivot sleeve 142 includes a blocking aperture 145. The blocking aperture 145 extends circumferentially about the pivot sleeve 142. In some embodiments, the blocking aperture 145 extends for a predetermined distance.

For example, the blocking aperture 145 may extend around half of the circumference of the pivot sleeve 142. A blocking pin 147 coupled to the first shaft portion 144 of the release arm 138 extends through the blocking aperture 145 in the illustrated embodiment. The blocking pin 147 is configured to block over rotation of the release arm 138 about the release arm axis 148. For example, the blocking pin 147 blocks the release arm 138 from rotating past the neutral position through contact with the pivot sleeve 142.

In the illustrated embodiment, the first shaft portion 144 of the release arm 138 is disposed within the pivot shaft 140. For instance, the pivot shaft 140 surrounds the first shaft portion 144 at two locations on either side of the pivot sleeve 142. In some embodiments, the pivot shaft 140 extends through the pivot sleeve 142. Moreover, the pivot shaft 140 is coupled to the mounting wall 106 in the illustrated embodiment. Accordingly, as described below, the pivot shaft 140 rotates about the release arm axis 148 with the release arm 138 after the release arm 138 freely rotates within the pivot sleeve 142 a predetermined amount. As shown, the pivot shaft 140 includes activation apertures 149 extending circumferentially about the pivot shaft 140. Moreover, in the illustrated embodiment, the first shaft portion 144 includes activation pins 151 extending from the first shaft portion 144 through the activation apertures 149. The activation pins 151 are configured to contact the pivot shaft 140 after the first shaft portion 144 rotates a predetermined amount about the release arm axis 148. For example, the activation pins 151 are not in contact with the pivot shaft 140 when the release arm 138 is in the neutral position. However, as described in detail below, when the release arm 138 rotates about the release arm axis 148, the rotation of the first shaft portion 144 drives the activation pins 151 through the activation apertures 149 and into contact with the pivot shaft 140. As a result, the rotational force of the release arm 138 is transferred to the pivot shaft 140. As will be described below, the transfer of the rotational force of the release arm 138 to the pivot shaft 140 enables the mounting wall 106 to rotate about the release arm axis 148.

In the illustrated embodiment, the release assembly 136 includes biasing members 152 disposed about the first shaft portion 144 of the release arm 138. In the illustrated embodiment, the biasing members 152 are coil springs wound around the first shaft portion 144 of the release arm 138. The biasing members 152 are configured to urge the release arm toward a neutral position 154, as illustrated. As mentioned above, in some embodiments the mounting wall 106 rotates about the release arm axis 148. As such, the biasing members 152 urge the release arm 138 to rotate about the release arm axis 148, thereby urging the mounting wall 106 toward the neutral position 154. In the neutral position 154, the needle gripper 98 is configured to secure the strap 76 within the strap guide 124 and between the thumb gripper 102 and surface 103 of the needle 92.

Figure 5:
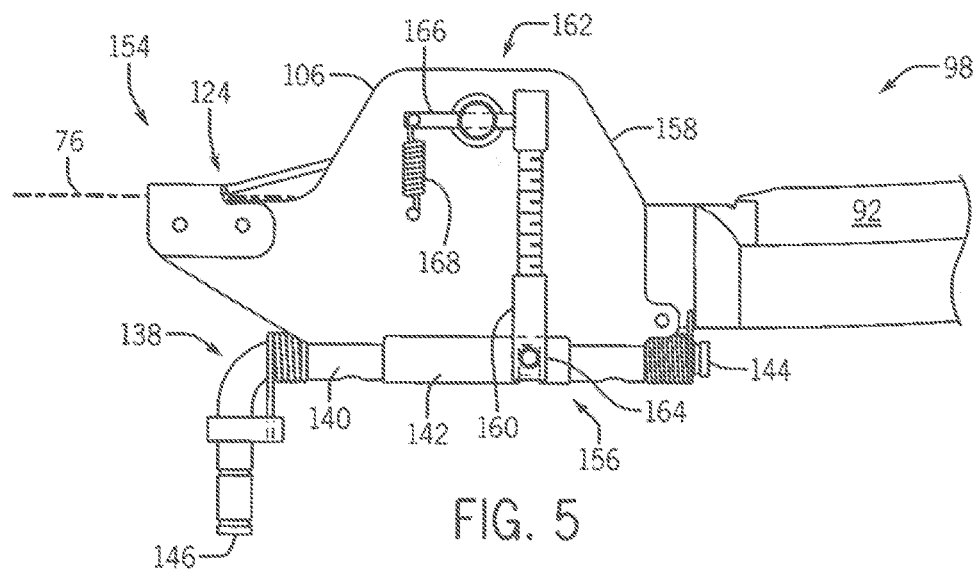
FIG. 5 is a left side view of the needle gripper of FIG. 4, in which a release linkage is in a neutral position.

Turning to FIG. 5, a left side view of the needle gripper 98 is shown. As illustrated, the needle gripper 98 is in the neutral position 154. In the illustrated embodiment, the needle gripper 98 includes a release linkage 156 coupled to a back side 158 of the mounting wall 106. The release linkage 156 is configured to couple the release arm 138 to the thumb gripper 102. For instance, a coupling link 160 extends between the first shaft portion 144 of the release arm 138 and a thumb gripper linkage 162. In the illustrated embodiment, the pivot sleeve 142 includes an aperture 164 through which the coupling link 160 couples to the first shaft portion 144. The coupling link 160 is configured to transfer the rotational movement of the release arm 138 about the release arm axis 148 to the release linkage 156. As a result, the thumb gripper 102 can rotate about the thumb gripper axis 110 from the neutral position 154 to the release position.

Returning to the thumb gripper linkage 162, a horizontal link 166 extends from the coupling link 160 to a thumb gripper biasing member 168. In the illustrated embodiment, the horizontal link 166 is coupled to the back side of the mounted bearing 108. Accordingly, rotation of the horizontal link 166 drives the thumb gripper 102 to rotate. The thumb gripper biasing member 168 is configured to apply a force to the horizontal linkage 166 that urges the thumb gripper 102 to rotate about the mounted bearing 106 in the first direction 112 about the thumb gripper axis 110. As a result, the thumb gripper 102 presses the strap 76 against the surface 103 of the needle 92 to secure the strap 76 to the needle gripper 98. In some embodiments, the thumb gripper biasing member 168 is a spring.

In the illustrated embodiment, the horizontal link 166 is configured to rotate the thumb gripper 102 in the second direction 114 about the thumb gripper axis 110 in response to downward movement of the coupling link 160. For example, rotation of the release arm 138 about the release arm axis 148 induces the coupling link 160 to move downwardly. The downward movement of the coupling link 160 drives the horizontal link 166 to rotate in the second direction 114 about the thumb gripper axis 110. The rotation of the horizontal link 166 about the thumb gripper axis 110 is transferred to the thumb gripper biasing member 168 to elongate the spring and to the thumb gripper 102 to induce rotation of the thumb gripper 102 in the second direction 114. As a result, the release linkage 156 releases the strap 76 from the thumb gripper 102. Furthermore, as discussed in detail below, rotation of the release arm 138 about the release arm axis 148 induces rotation of the mounting wall 106 about the release arm axis 148.

FIG. 6 is a top view of the needle gripper 98. As shown, the needle gripper 98 is in the neutral position 154. Accordingly, the strap 76 is compressed between the needle 92 and the thumb gripper 102. Moreover, the strap 76 is positioned between the top plate 128 and the bottom plate 130 of the strap guide 124.

FIG. 7 is a top view of the needle gripper 98. In the illustrated embodiment, the needle gripper 98 is in a first release position 170. As described herein, the first release position 170 refers to a thumb release position 172. In the thumb release position 172, the vertical shaft portion 144 of the release arm 138 is at a thumb release angle 176 about the release arm axis 148. As described below, an engagement plate may urge the release arm 138 to rotate about the release arm axis 148. In the illustrated embodiment, as the release arm 138 rotates about the release arm axis 148 toward the thumb release position 172, the coupling link 160 is pulled in a downward direction. Moreover, the force from the rotation of the release arm 138 is transferred to the thumb gripper linkage 162 through the coupling link 160. As a result, the horizontal link 166 urges the thumb gripper biasing member 168 to rotate (e.g., elongate the spring) in the second direction 114 about the thumb gripper axis 110. Moreover, in some embodiments, the horizontal link 166 rotates the mounted bearing 108 in the second direction 114. Accordingly, the thumb gripper 102 rotates in the second direction 114 about the thumb gripper axis 110, thereby lifting the thumb gripper 102 off of the strap 76. As a result, the strap is no longer compressed against the surface 103 of the needle 92 by the thumb gripper 102. In some embodiments, a secondary gripper may grasp the strap 76 from the needle gripper 98 when the thumb gripper 102 is no longer holding the strap 76 against the surface 103 of the needle 92.

As described above, the release arm 138 is configured to freely rotate inside of the pivot shaft 140 and the pivot sleeve 142. For example, the activation pins 151 of the release arm 138 do not contact the pivot shaft 140 until the release arm 138 is rotated a predetermined amount. In some embodiments, the predetermined amount is the thumb release angle 176. As a result, the mounting wall 106 stays in position while the thumb gripper 102 is rotated in the second direction 114, thereby lifting the thumb gripper 102 off of the strap 76.

FIG. 8 is a top view of the needle gripper 98 in a wall release position 174 (e.g., second release position). In the illustrated embodiment, the second shaft portion 146 of the release arm 138 is at a wall release angle 178 about the release arm axis 148. As shown, the wall release angle 178 is greater than the thumb release angle 176. In other words, the release arm 138 rotates about the release arm axis 148 farther to reach the wall release position 174 than to reach the thumb release position 172. As the release arm 138 rotates toward the wall release position 174, the mounting wall 106 rotates about the release arm axis 148 away from the mounting platform 104 and the needle 92. As described above, rotation of the release arm 138 about the release arm axis 148 farther than the thumb release angle 176 enables the activation pins 151 to rotate through the activation apertures 149 and contact the pivot shaft 140. As a result, the rotational force is transferred to the pivot shaft 140, which transfers the force to the mounting wall 106. The mounting wall 106 is configured to rotate about the release arm axis 148, moving the thumb gripper 102 out of alignment with the needle 92 and moving the top plate 128 of the strap guide 124 out of alignment with the bottom plate 130. As a result, the strap 76 is no longer contacted by the thumb gripper 102 and/or the top plate 128 of the strap guide 124. Moreover, the thumb gripper 102 is no longer adjacent to the needle 92 (i.e., the thumb gripper 102 is laterally offset from the needle 92, as illustrated). To that end, the secondary gripper may grasp the strap 76 from the needle gripper 98 and direct the strap 76 to another part of the baling chamber 14.

Figure 9:
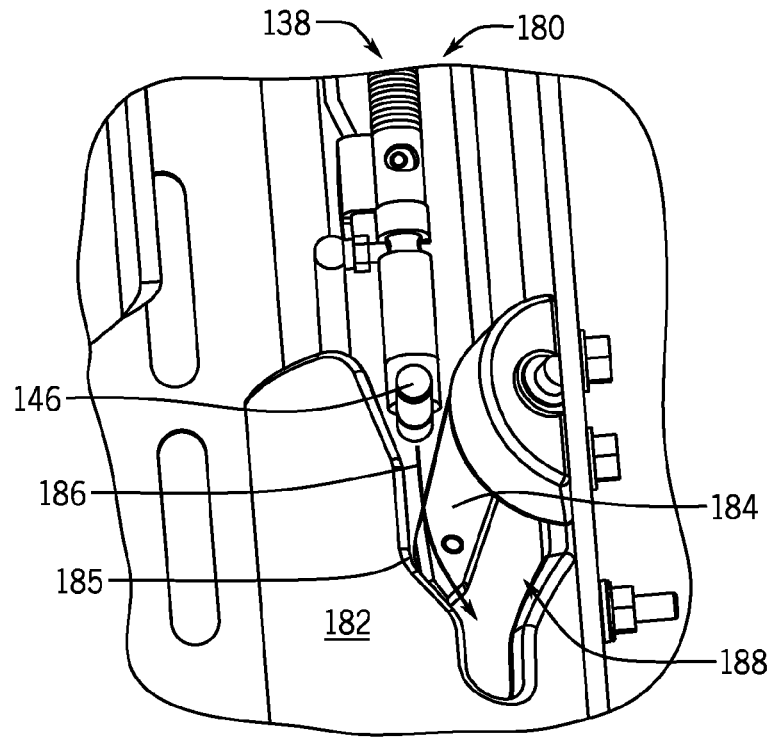
FIG. 9 is a bottom view of an embodiment of a release mechanism, in which the needle gripper of FIG. 4 is engaging the release mechanism.

As mentioned above, the needle gripper 98 may be urged into the release positions by the engagement plate. The engagement plate is configured to interact with the second shaft portion 146 of the release arm 138 to facilitate rotation about the release arm axis 148. FIG. 9 is a bottom view of an embodiment of a release mechanism 180. As shown, the release mechanism 180 includes an engagement plate 182 and a cam 184. The second shaft portion 146 of the release arm 138 is configured to engage a first surface 185 of the engagement plate 182 along a first path 186 that corresponds to the arcuate path of the needle 92 through the baling chamber 14 (i.e., from the first side 58 of the baling chamber 14 to the second side 60 of the baling chamber 14). In the illustrated embodiment, the needle gripper 98 is in the neutral position 154 because the needle gripper 98 has not interacted with the engagement plate 182. Furthermore, the cam 184 of the release mechanism 180 is biased toward the first side 185 of the engagement plate 182. For example, the release mechanism 180 may include a spring that urges the cam 184 toward the first side 185.

Figure 10:
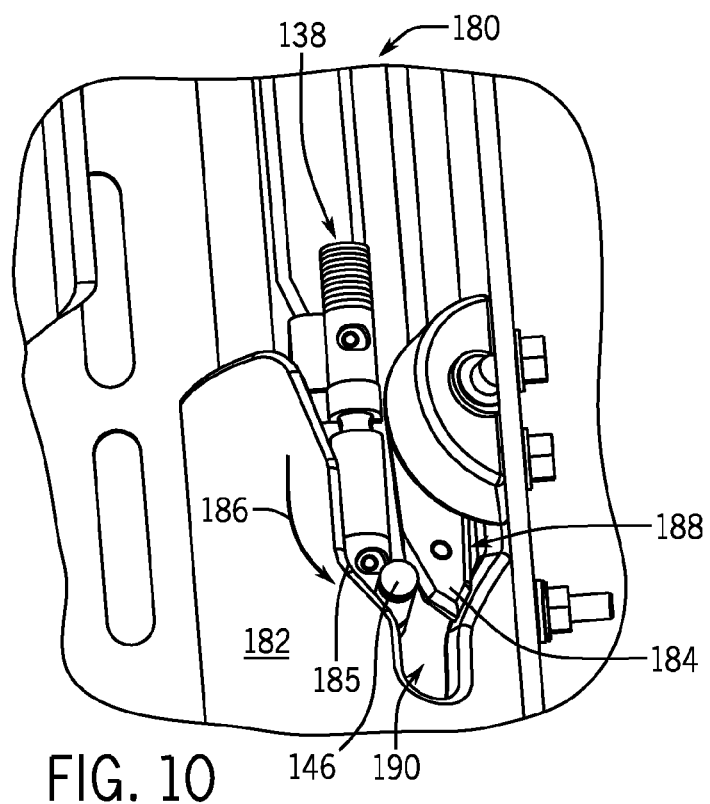
FIG. 10 is a bottom view of the release mechanism of FIG. 9, in which the needle gripper is in the first release position.

Turning to FIG. 10, a bottom view of the release mechanism 180, in which the needle gripper 98 is in the first release position 170, is shown. In the illustrated embodiment, the needle gripper 98 has traveled along the first path 186 against the first surface 185 of the engagement plate 182. As previously discussed, the first surface 185 of the engagement plate 182 urges the second shaft portion 146 of the release arm 138 to rotate about the release arm axis 148 as the release arm 138 travels along the first path 186. As shown, the cam 184 is driven to rotate toward a second surface 188 of the engagement plate 182 via contact with the release arm. The cam 184 directs the second shaft portion 146 of the release arm 138 toward a zero velocity point 190, as discussed below. In some embodiments, the needle gripper 98 is in the thumb release position 172 and the thumb gripper 102 is no longer pressing the strap 76 against the needle 92 while the release arm 138 is in the illustrated position. However, in other embodiments, the full thumb release angle 176 is not reached until the needle gripper 98 travels farther along the first path 186 (e.g., to the zero velocity point 190).

Figure 11:
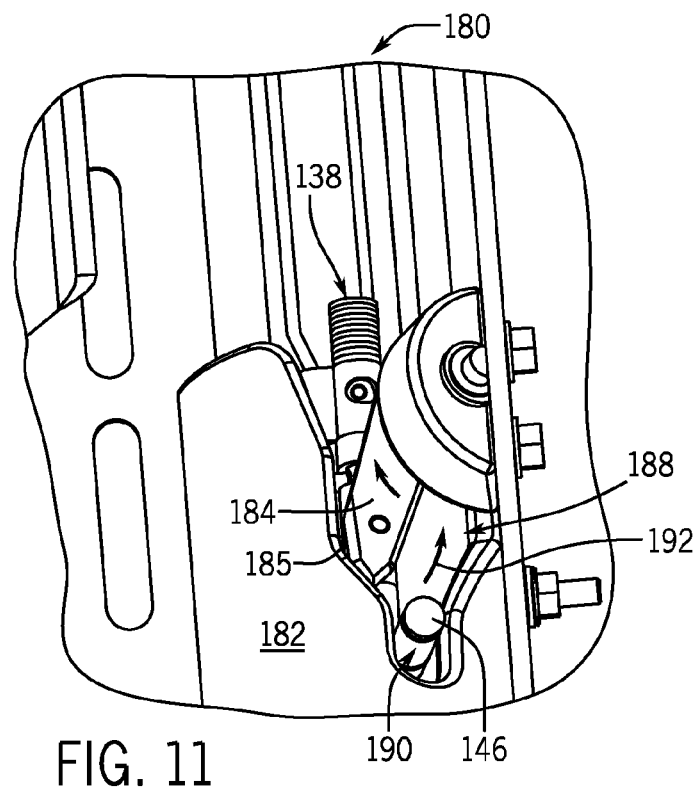
FIG. 11 is a bottom view of the release mechanism of FIG. 9, in which the needle is at a zero velocity point.

FIG. 11 is a bottom view of the release mechanism 180, in which the needle 92 is at the zero velocity point 190. The zero velocity point 190 is the end of the arcuate path of the needle 92. In other words, the zero velocity point 190 is the point where the needle 92 reverses direction to travel along a second path 192. The second path 192 is in the substantially opposite direction from the first path 186. As mentioned above, in some embodiments the needle gripper 98 may be in the thumb release position 172 before the second shaft portion 146 reaches the zero velocity point 190. However, in other embodiments, the thumb release angle 176 and the thumb release position 172 is not reached until the second shaft portion 146 reaches the zero velocity point 190. In the illustrated embodiment, the needle gripper 98 has traveled along the first path 184 against the first surface 185 of the engagement plate 182. The engagement plate 182 urges the release arm 138 to rotate about the release arm axis 148 as the release arm 138 travels along the first path 184. As a result, the needle gripper 98 is in a thumb release position 172 and the thumb gripper 102 is no longer pressing the strap 76 against the surface 103 of the needle 92.

As shown in FIG. 11, the second shaft portion 146 is past the cam 184 when the second shaft portion 146 is at the zero velocity point 190. As mentioned above, the cam 184 is biased toward the first surface 185 of the engagement plate 182. For example, the spring urges the cam 184 away from the far side 188 of the engagement plate 182. As described below, while the cam 184 is positioned against the first surface 185 of the engagement plate 182, the cam 184 directs the second shaft portion 146 to travel along the second surface 188 of the engagement plate 182, as the needle 92 moves along the second path 192. However, in other embodiments, the second shaft portion 146 travels along the cam 184.

Figure 12:
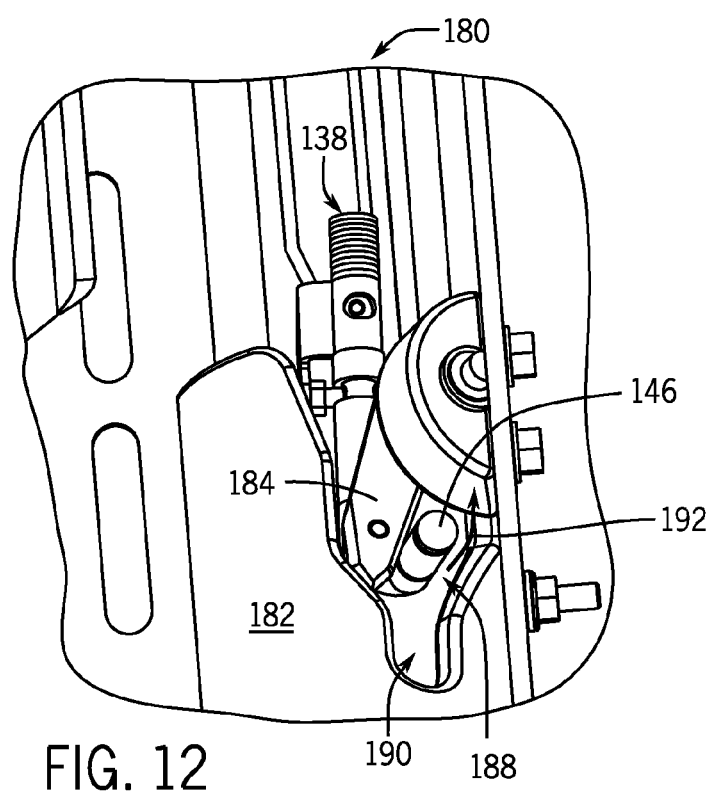
FIG. 12 is a bottom view of the release mechanism of FIG. 9, in which the needle gripper is in the second release position.

As described above, the wall release angle 178 is larger than the thumb release angle 176. As a result, a larger rotation about the release arm axis 148 utilized to move the needle gripper 92 to the wall release position 174. FIG. 12 is a bottom view of the release mechanism 180, in which the needle gripper 98 is in the second release position 174. As shown, the second shaft portion 146 rotates about the release arm axis 148 as the second shaft portion 146 travels along the second surface 188 of the engagement plate 182. The additional rotation facilitates movement from the thumb release position 172 to the wall release position 174. In other words, the additional rotation of the release arm 138 is induced as the second shaft portion 146 travels along the second path 192. Moreover, as mentioned above, the needle is travelling along an arcuate path. Therefore, second shaft portion 146 moves out of contact with the cam 184 and out of the release mechanism 180 as the needle 92 continues to move along the second path 192. As a result, the biasing members 152 of the release assembly 136 urge the release arm 138 to rotate about the release arm axis 148 toward the neutral position 154. Accordingly, the needle gripper 98 will be ready to accept another strap 76 from the strap feeding assembly 78.

Figure 13:
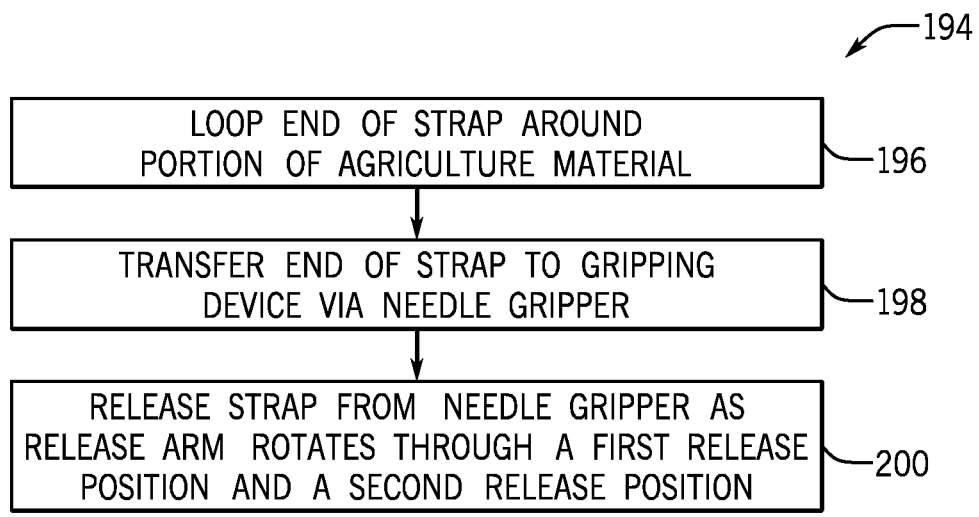
FIG. 13 is a flow chart of an embodiment of a method for releasing a strap from a needle gripper.

FIG. 13 is a flow chart of a method 194 for releasing the strap 76 from the needle gripper 98. An end of the strap 76 is looped around at least a portion of agricultural material at block 196. For example, the strap 76 may loop around the material via the tracks 56 in the baling chamber 14. In the illustrated embodiment, the end of the strap 76 is transferred to a gripping device via the needle gripper 98 at block 198. As mentioned above, the needle gripper 98 is configured to hold the strap 76 against the surface 103 of the needle 92 as the needle travels through the baling chamber 14. In some embodiments, the strap 76 transfer occurs at the end of the arcuate path of the needle 92. The strap 76 is released from the needle gripper 98 as the release arm 138 rotates about the release arm axis 148 from the neutral position 154 through the first release position 170 and to the second release position 174 at block 200. For example, the release arm 138 travels along the first path 186 along the first side 185 of the engagement plate 182. The engagement plate 182 urges the release arm 138 to rotate about the release arm axis 148 to the first release position 170. As mentioned above, in some embodiments the first release position 170 includes the thumb release position 172 in which the thumb gripper 102 is rotated away from the surface 103 of the needle 92 to release the strap 76. Moreover, the release arm 138 moves along the second path 192 against the second surface 188 of the engagement plate 182 and/or the cam 184. The movement along the second path 192 increases the rotation of the release arm 138 about the release arm axis 148 to the second release position 174 in which the mounting wall 106 is rotated about the release arm axis 148. Rotation of the mounting wall 106 about the release arm axis 148 offsets the thumb gripper 102 from the surface 103 of the needle 92. Additionally, rotation of the mounting wall 106 rotates the top plate 128 of the strap guide 124 out of alignment with the bottom plate 130 of the strap guide 124. As a result, the strap 76 is free to transfer to the sealing assembly 80 or the secondary gripper.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An agricultural baler comprising:
a needle configured to be disposed within a baling chamber, wherein the needle is configured to transfer a strap to a gripping device; and
a needle gripper disposed on a distal end of the needle and configured to selectively secure the strap to the needle, wherein the needle gripper comprises:
a thumb gripper rotatably mounted to a wall of the needle gripper, wherein the thumb gripper is configured to rotate between a first position configured to secure the strap against a surface of the needle and a second position configured to release the strap from the needle; and
a release arm coupled to the thumb gripper, wherein the release arm is configured to rotate the thumb gripper from the first position to the second position in response to rotation of the release arm about a release arm axis from a neutral position to a first release position; and
an engagement plate disposed along a path of travel of the needle, wherein the engagement plate contacts the release arm and urges the release arm to rotate from the neutral position to the first release position and from the first release position to a second release position.

2. The agricultural baler of claim 1, wherein the thumb gripper is biased to rotate toward the first position, and the thumb gripper is configured to block the strap from moving away from the distal end of the needle in a first direction toward a proximal end of the needle.

3. The agricultural baler of claim 1, further comprising a strap guide positioned on a distal end of the needle gripper, wherein the strap guide is configured to secure the strap between a top surface and a bottom surface of the strap guide while the wall is in a third position.

4. The agricultural baler of claim 1, wherein the release arm is biased to rotate toward the neutral position.

5. The agricultural baler of claim 1, wherein the thumb gripper comprises a textured surface configured to grip the strap.

6. The agricultural baler of claim 1, further comprising a cam positioned adjacent to a first surface of the engagement plate, wherein the cam is configured to move toward a second surface of the engagement plate via contact with the release arm, and the cam is configured to direct the release arm along a first path of travel while the cam is positioned adjacent to the second surface and to direct the release arm along a second path of travel while the cam is positioned adjacent to the first surface.

7. An agricultural baler comprising:
a needle configured to be disposed within a baling chamber, wherein the needle is configured to transfer a strap to a gripping device; and
a needle gripper disposed on a distal end of the needle and configured to selectively secure the strap to the needle, wherein the needle gripper comprises:
a thumb gripper rotatably mounted to a wall of the needle gripper, wherein the thumb gripper is configured to rotate between a first position configured to secure the strap against a surface of the needle and a second position configured to release the stray from the needle; and
a release arm coupled to the thumb gripper, wherein the release arm is configured to rotate the thumb gripper from the first position to the second position in response to rotation of the release arm about a release arm axis from a neutral position to a first release position; and
a release linkage coupled to the wall and to the release arm, wherein the release linkage is configured to rotate the wall from a third position configured to align the thumb gripper with the surface of the needle and a fourth position configured to offset the thumb gripper from the surface of the needle in response to rotation of the release arm about the release arm axis from the neutral position and the first release position to a second release position.

8. An agricultural baler comprising:
a needle configured to be disposed within a baling chamber, wherein the needle is configured to transfer a strap to a gripping device; and
a needle gripper disposed on a distal end of the needle and configured to selectively secure the strap to the needle, wherein the needle gripper comprises:

a thumb gripper rotatably mounted to a wall of the needle gripper, wherein the thumb gripper is configured to secure the strap against a surface of the needle;
a strap guide positioned on a distal end of the needle gripper, wherein the strap guide comprises a top plate mounted to the wall and configured to secure the strap against a bottom plate mounted to the needle; and
a release arm coupled to the wall, wherein the release arm is configured to rotate the wall between a first position configured to align the thumb gripper with the surface of the needle and to align the top surface of the strap guide with the bottom surface of the strap guide, and a second position configured to offset the thumb gripper and strap guide from the strap via rotation of the release arm about a release arm axis.

9. The agricultural baler of claim 8, wherein the release arm is biased to rotate toward a neutral position that positions the wall in the first position.

10. The agricultural baler of claim 8, wherein the top plate of the strap guide is positioned adjacent to the bottom plate of the strap guide while the release arm is in a neutral position.

11. The agricultural baler of claim 8, wherein the top plate of the strap guide is biased toward the bottom plate of the strap guide.

12. The agricultural baler of claim 8, further comprising an engagement plate disposed along a path of travel of the needle, wherein the engagement plate contacts the release arm and urges the release arm to rotate from a neutral position that positions the wall in the first position to a release position that positions the wall in the second position.

13. The agricultural baler of claim 12, further comprising a cam positioned adjacent to a first surface of the engagement plate, wherein the cam is configured to move toward a second surface of the engagement plate via contact with the release arm, and the cam is configured to direct the release arm along a first path of travel while the cam is positioned adjacent to the second surface and to direct the release arm along a second path of travel while the cam is positioned adjacent to the first surface.

14. The agricultural baler of claim 13, wherein the cam is biased toward a first side of the engagement plate, and the release arm contacts the first side of the engagement plate as the needle moves along the first path of travel, and the release arm contacts the second side of the engagement plate as the needle moves along a second path of travel, the second path of travel being opposite the first path of travel.

15. A method for baling an agricultural material comprising:
looping an end of a strap around at least a portion of the agricultural material;
transferring the end of the strap to a gripping device via a needle gripper on a distal end of a needle; and
releasing the strap from the needle gripper as a release arm of the needle gripper rotates about a release arm axis from a neutral position through a first release position and to a second release position, wherein the release arm is coupled to a release linkage configured to rotate a thumb gripper from a first position in which the thumb gripper is configured to secure the strap to a surface of the needle to a second position configured to release the strap from the needle in response to rotation of the release arm from the neutral position to the first release position, and the release arm is coupled to a wall configured to rotate from a third position in which the thumb gripper is aligned with the needle and a fourth position configured to offset the thumb gripper from the surface of the needle in response to rotation of the release arm from the neutral position to the second release position.

16. The method of claim 15, wherein releasing the strap from the needle gripper comprises moving the release arm of the needle gripper along a first surface of an engagement plate as the needle moves along a first path of travel, wherein the first surface of the engaging plate urges the release arm to rotate about the release arm axis from the neutral position to the first release position.

17. The method of claim 16, wherein releasing the strap from the needle gripper comprises moving the release arm of the needle gripper along a second surface of the engagement plate as the needle moves along a second path of travel, wherein the second surface of the engagement plate urges the release arm to rotate about the release arm axis from the first release position to the second release position, the second path of travel being substantially opposite the first path of travel.

18. The method of claim 15, wherein releasing the strap from the needle gripper comprises rotating a top plate of a strap guide away from a bottom plate of the strap guide in response to rotation of the release arm from the neutral position to the second release position, wherein the top plate of the strap guide is mounted to the wall and the bottom plate of the strap guide is mounted to the needle.

19. The method of claim 15, further comprising urging the release arm toward the neutral position via a biasing member.

* * * * *